(12) United States Patent
Tsuchiya et al.

(10) Patent No.: US 10,794,450 B2
(45) Date of Patent: Oct. 6, 2020

(54) TRANSMISSION BELT

(71) Applicant: BANDO CHEMICAL INDUSTRIES, LTD., Kobe-shi, Hyogo (JP)

(72) Inventors: Taiki Tsuchiya, Kobe (JP); Shogo Kobayashi, Kobe (JP); Keiichiro Matsuo, Kobe (JP); Hiroyuki Tachibana, Kobe (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 16/719,447

(22) Filed: Dec. 18, 2019

(65) Prior Publication Data

US 2020/0124135 A1    Apr. 23, 2020

Related U.S. Application Data

(63) Continuation of application No. PCT/JP2018/016199, filed on Apr. 19, 2018.

(30) Foreign Application Priority Data

Jun. 19, 2017  (JP) .................................. 2017-119560

(51) Int. Cl.
    *F16G 1/08*    (2006.01)
    *F16G 1/28*    (2006.01)
    (Continued)

(52) U.S. Cl.
    CPC ................ *F16G 1/08* (2013.01); *C08L 11/02* (2013.01); *F16G 1/28* (2013.01); *F16G 5/06* (2013.01);
    (Continued)

(58) Field of Classification Search
    CPC ..... F16G 1/08; F16G 1/10; F16G 1/22; F16G 1/28; F16G 5/06; F16G 5/20; C08L 2205/16; C08B 3/20
    See application file for complete search history.

(56) References Cited

U.S. PATENT DOCUMENTS 3,981,206 A * 9/1976 Miranti, Jr. .......... B29D 29/103
                                                474/238
4,632,665 A * 12/1986 Skura ..................... B29D 29/08
                                                474/205
(Continued)

FOREIGN PATENT DOCUMENTS

JP    2014-167347 A    9/2014
JP    2016-205565 A    12/2016
(Continued)

OTHER PUBLICATIONS

JP Notice of Reasons for Refusal dated Jul. 17, 2018 as received in Application No. 2018-525628.
(Continued)

*Primary Examiner* — Michael R Mansen
*Assistant Examiner* — Robert T Reese
(74) *Attorney, Agent, or Firm* — Maschoff Brennan

(57) ABSTRACT

A power transmission belt at least includes a bottom rubber layer. A rubber composition for forming the bottom rubber layer contains a rubber component, cellulose fine fibers, and short fibers. The cellulose fine fibers have an average diameter from 1 nm to 200 nm, and the rubber composition contains 0.5 parts by mass or more of the cellulose fine fibers relative to 100 parts by mass of the rubber component. The short fibers have an average diameter from 5 μm to 30 μm, and the rubber composition contains 1 part by mass or more of the short fibers relative to 100 parts by mass the rubber component.

4 Claims, 14 Drawing Sheets

(51) Int. Cl.
*C08L 11/02* (2006.01)
*F16G 5/06* (2006.01)
*F16G 5/20* (2006.01)

(52) U.S. Cl.
CPC ............ *F16G 5/20* (2013.01); *C08L 2205/03* (2013.01); *C08L 2205/16* (2013.01); *C08L 2310/00* (2013.01)

(56) References Cited

U.S. PATENT DOCUMENTS

| | | | |
|---|---|---|---|
| 6,770,004 B1* | 8/2004 | Lofgren | F16G 1/00 474/264 |
| 8,632,650 B2* | 1/2014 | Mori | D03D 3/02 156/141 |
| 2012/0097352 A1* | 4/2012 | Rasanen | D21H 21/14 162/157.6 |
| 2013/0217528 A1* | 8/2013 | Matsumoto | D02G 3/44 474/263 |
| 2015/0369335 A1 | 12/2015 | Ishiguro et al. | |
| 2016/0351874 A1* | 12/2016 | Kang | H01M 10/0525 |
| 2017/0009847 A1* | 1/2017 | Mitsutomi | F16G 5/20 |
| 2018/0326680 A1* | 11/2018 | Okubo | F16G 1/12 |
| 2018/0372184 A1* | 12/2018 | Okubo | C08L 23/00 |
| 2020/0172684 A1* | 6/2020 | Hiroishi | B29B 17/02 |

FOREIGN PATENT DOCUMENTS

| | | |
|---|---|---|
| JP | 2016-211589 A | 12/2016 |
| WO | 2016/170795 A1 | 10/2016 |

OTHER PUBLICATIONS

JP Decision to Grant a Patent dated Oct. 2, 2018 as received in Application No. 2018-525628.
International Search Report in PCT application PCT/JP2018/016199 dated Jul. 10, 2018.
Written Opinion in PCT application PCT/JP2018/016199 dated Jul. 10, 2018.

* cited by examiner

FIG.14
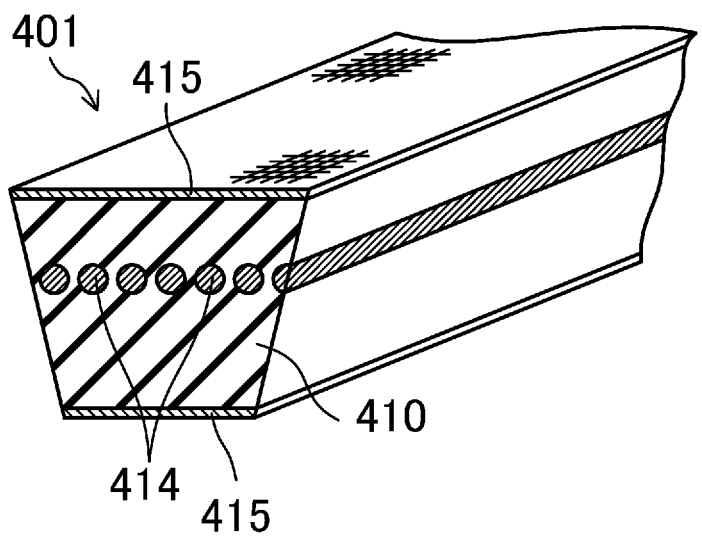
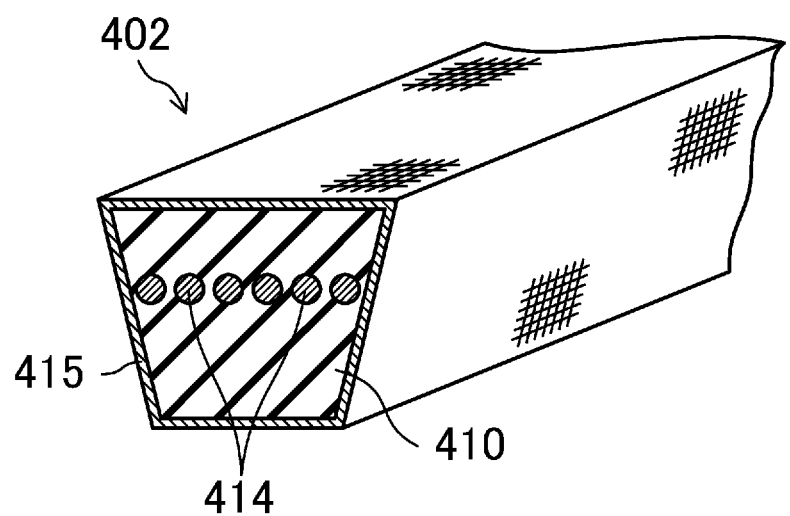
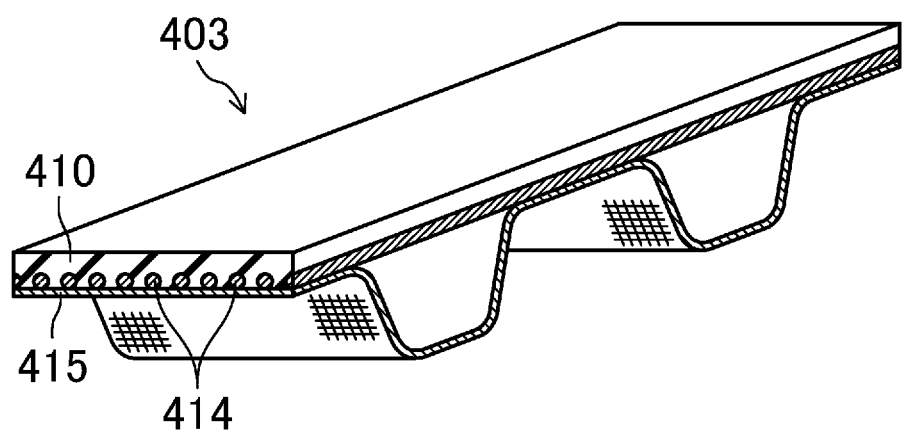

TRANSMISSION BELT

CROSS-REFERENCE TO RELATED APPLICATION

This application claims priority to International Patent Application No. PCT/JP2018/016199 filed on Apr. 19, 2018 and Japanese Patent Application No. 2017-119548 filed on Jun. 19, 2017, the entire disclosure of which is incorporated by reference herein.

BACKGROUND ART

Various substances are added to the rubber composition for forming power transmission belts in order to obtain desired characteristics. For example, Patent Japanese Unexamined Patent Publication No. 2014-167347 discloses that at least a compression layer of a V-ribbed belt is formed of a rubber composition containing carbon black and short fibers.

SUMMARY

There are demands for various characteristics of the power transmission belts using a rubber composition. The present disclosure describes a technique for improving durability and transmission efficiency for power transmission belts produced using a rubber composition.

A power transmission belt of the present disclosure at least includes a bottom rubber layer. A rubber composition for forming the bottom rubber layer contains a rubber component, cellulose fine fibers, and short fibers. The cellulose fine fibers have an average diameter from 1 nm to 200 nm, and the rubber composition contains 0.5 parts by mass or more of the cellulose fine fibers relative to 100 parts by mass of the rubber component. The short fibers have an average diameter from 5 μm to 30 μm, and the rubber composition contains 1 part by mass or more of the short fibers relative to 100 parts by mass the rubber component.

According to the power transmission belt of the present disclosure, durability and transmission efficiency are improved.

BRIEF DESCRIPTION OF THE DRAWINGS

FIG. 14 shows drawings schematically illustrating a wrapped V-belt, a raw-edge V-belt, and a toothed belt according to the embodiment.

DETAILED DESCRIPTION

Figure 1:
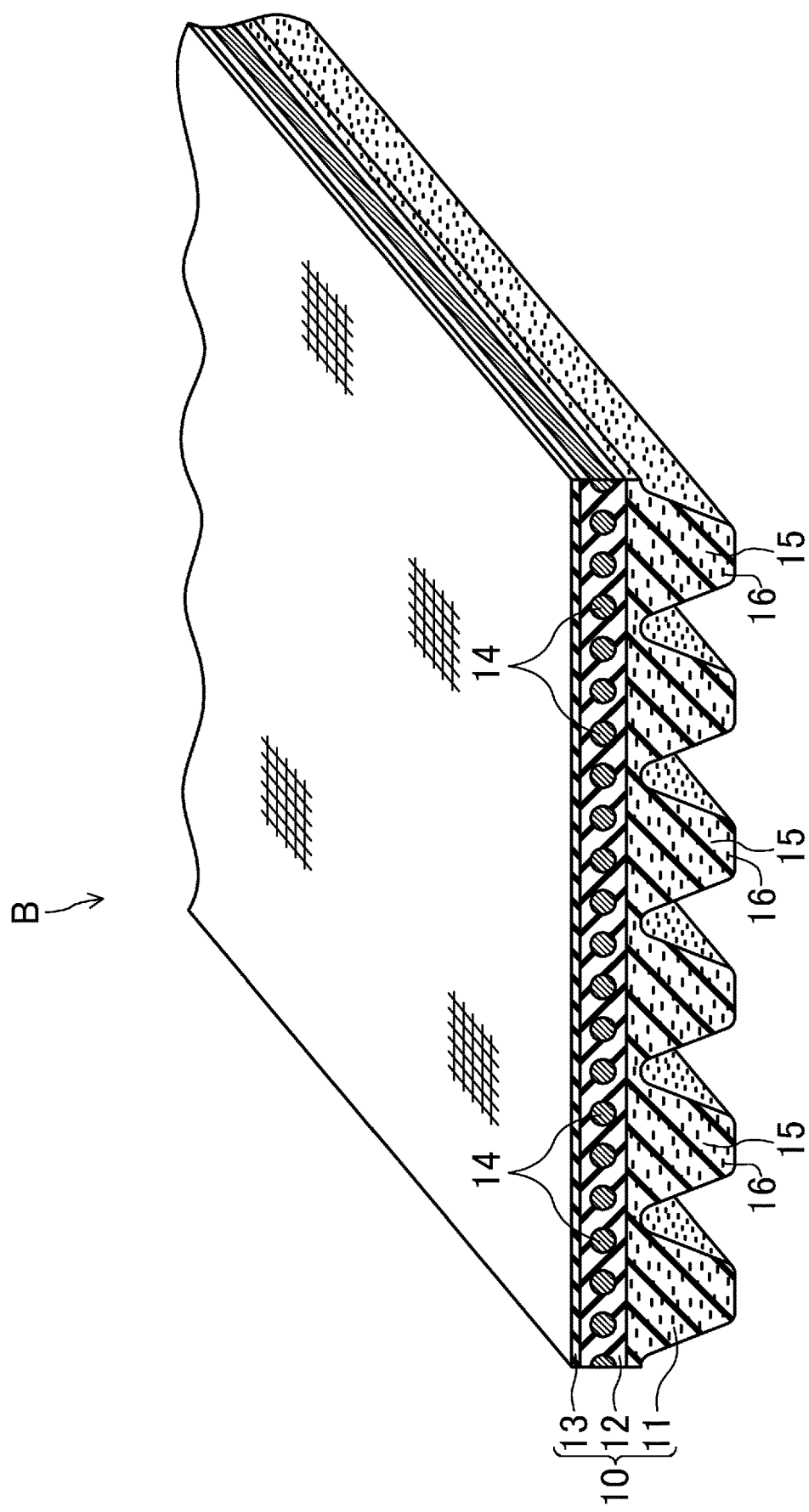
FIG. 1 is a perspective view schematically illustrating a V-ribbed belt according to an embodiment of the present disclosure.

An embodiment of the present disclosure will now be described below.

(Rubber Composition)

The rubber composition according to the present embodiment is obtained by heating and pressurizing an uncrosslinked rubber composition containing cellulose nanofibers (hereinafter also referred to as "CNFs") and short fibers dispersed in a rubber component to crosslink the rubber component. The content of the CNFs is preferably 0.5 parts by mass or more, more preferably 1 part by mass or more, and preferably 20 parts by mass or less, more preferably 10 parts by mass or less, relative to 100 parts by mass of the rubber component. The content of the short fibers is preferably 1 part by mass or more, more preferably 5 parts by mass or more, and preferably 40 parts by mass or less, more preferably 30 parts by mass or less, relative to 100 parts by mass of the rubber component.

Examples of the rubber component include: ethylene-α-olefin elastomers such as ethylene propylene copolymer (EPR), ethylene-propylene-diene terpolymer (EPDM), ethylene-octene copolymer, and ethylene-butene copolymer; a chloroprene rubber (CR); a chlorosulfonated polyethylene rubber (CSM); and a hydrogenated acrylonitrile rubber (H-NBR). The rubber component is preferably one kind of them or two or more kinds of them. The rubber component is particularly preferably chloroprene rubber (CR).

When the CR is used as the rubber component, the CR is a main component, and the content of the CR in the rubber component is preferably more than 50 mass %. In order to substantially prevent heat generation and obtain excellent wear resistance, the content is preferably 80 mass % or more, more preferably 90 mass % or more, most preferably 100 mass %.

Examples of the CR include a sulfur-modified CR of G type, a mercaptan-modified CR of W type, a highly crystalline CR of A type, a low-viscosity CR, and a carboxylated CR. The CR contained in the rubber component includes preferably one kind of them or two or more kinds of them, more preferably a sulfur-modified CR, yet more preferably a sulfur-modified CR as a main component, much more preferably is composed of only a sulfur-modified CR in order to obtain transmission efficiency and durability of the belt. The rubber component is most preferably composed of only a sulfur-modified CR.

The CNFs are made of a cytoskeleton component of a plant cell wall obtained by disentangling plant fibers. Examples of a raw material pulp for the CNFs include wood, bamboo, rice plants (rice straw), potato, sugarcane (bagasse), water plants, and seaweed. The pulp raw material is preferably a wood pulp among them.

Examples of the CNFs include TEMPO-oxidized CNFs and mechanically-defibrated CNFs. The CNFs include preferably one or two kinds of them, more preferably TEMPO-oxidized CNFs, yet more preferably TEMPO-oxidized CNFs as a main component, much more preferably are composed of only TEMPO-oxidized CNFs.

The TEMPO-oxidized CNFs are CNFs obtained by causing a co-oxidant to act on cellulose contained in raw material pulps using an N-oxyl compound as a catalyst in order to selectively oxide a hydroxyl group at the position C6 of the cellulose molecule and then mechanically fining down the resultant substance. Examples of the N-oxyl compound include a free radical of 2,2,6,6-tetramethylpiperidine-1-oxyl (TEMPO) and 4-acetamide-TEMPO. Examples of the co-oxidant include hypohalous acids and salts thereof, halogenous acids and salts thereof, perhalogen acids and salts thereof, hydrogen peroxide, and organic peracids. The mechanically-defibrated CNFs are CNFs obtained by pulverizing raw material pulps with a defibrating apparatus such as a kneader such as a biaxial kneader, a high-pressure homogenizer, a grinder, and a bead mill.

The fiber diameters of the TEMPO-oxidized CNFs are, for example, from 1 nm to 10 nm, and a distribution thereof is narrow. The fiber diameters of the mechanically-defibrated CNFs are several tens of nanometers to several hundreds of nanometers. Thus, the TEMPO-oxidized CNFs and the mechanically-defibrated CNFs can be clearly distinguished from each other by the size of the fiber diameters and the distributions thereof.

The average fiber diameter of the CNFs contained in the rubber composition according to the present embodiment is preferably 1 nm or more, more preferably 2 nm or more and is preferably 200 nm or less, more preferably 50 nm or less, yet more preferably 20 nm or less.

The CNFs may include hydrophobically-treated CNFs (hydrophobized CNFs). Examples of the hydrophobized CNFs include CNFs in which some or all of the hydroxyl groups of cellulose are substituted by hydrophobic groups and CNFs having surfaces which have been hydrophobically treated with a surface treatment agent. The hydrophobization of the CNFs in which some or all of the hydroxyl groups of the cellulose have been substituted by hydrophobic groups may be achieved by esterification, alkylation, tosylation, epoxidation, and arylation, for example. Among these yarns, plied yarn is suitable. Specifically, the hydrophobized CNFs obtained by esterification are CNFs in which some or all of the hydroxyl groups of the cellulose have been acylated with any of carboxylic acids such as acetic acid, acetic anhydride, propionic acid, and butyric acid or with any of halides of these acids. Examples of the surface treatment agent used to obtain the CNFs having surfaces that have been hydrophobically treated with the surface treatment agent include silane coupling agents.

Examples of the short fibers include para-aramid short fibers, meta-aramid short fibers, nylon 6 short fibers, nylon-6,6 short fibers, nylon-4,6 short fibers, polyethylene terephthalate short fibers, and polyethylene naphthalate short fibers. The short fibers include preferably one kind of them or two or more kinds of them, more preferably para-aramid short fibers, yet more preferably para-aramid short fiber as a main component, much more preferably are composed of only para-aramid short fibers.

Examples of the para-aramid short fibers include short fibers of polypara polyphenyleneterephthalamide (e.g., KEVLAR manufactured by DuPont, Twaron manufactured by TEIJIN LIMITED) and short fibers of copolyparaphenylene-3,4-oxydiphenylene terephtalamide (e.g., Technora manufactured by TEIJIN LIMITED). The para-aramid short fibers include preferably one or two kinds of them, more preferably short fibers of copolyparaphenylene-3,4-oxydiphenylene terephtalamide, yet more preferably short fibers of copolyparaphenylene-3,4-oxydiphenylene terephtalamide as a main component, much more preferably are composed of only short fibers of copolyparaphenylene-3,4-oxydiphenylene terephtalamide.

The fiber lengths of the short fibers are preferably from 0.5 mm to 5.0 mm, more preferably from 1.0 mm to 3.0 mm. The fiber diameters of the short fibers are preferably 5.0 μm or more, more preferably 8 μm or more and preferably 30 μm or less, more preferably 25 μm or less.

A crosslinking agent for CR may be added to an uncrosslinked rubber composition for forming the rubber composition according to the embodiment. Examples of the crosslinking agent include metal oxides such as zinc oxide and magnesium oxide. Zinc oxide and magnesium oxide are preferably used in combination as the crosslinking agent. The amount of zinc oxide to be added is preferably from 3 parts by mass to 7 parts by mass, more preferably from 4 parts by mass to 6 parts by mass, relative to 100 parts by mass of the rubber component. The amount of magnesium oxide to be added is preferably from 3 parts by mass to 7 parts by mass, more preferably from 4 parts by mass to 6 parts by mass, relative to 100 parts by mass of the rubber component.

In the rubber composition according to the present embodiment, carbon black (hereinafter, also referred to as "CB") may be dispersed. Examples of the carbon black include: channel black; furnace black such as SAF, ISAF, N-339, HAF, N-351, MAF, FEF, SRF, GPF, ECF, and N-234; thermal black such as FT and MT; and acetylene black. The CB includes preferably one kind of them or two or more kinds of them, more preferably FEF, yet more preferably FEF as a main component, much more preferably is composed of only FEF.

The rubber composition according to the embodiment may further contain compound ingredients such as a plasticizer, a processing aid, a vulcanization accelerator aid, and a vulcanization accelerator.

The rubber composition according to the embodiment described above can be obtained by adding CNFs to a CR latex, removing a solvent from the resultant mixture to produce a master batch in which the CNFs are dispersed in the CR, and then adding, to the master batch or to a dilution obtained by kneading the master batch with a rubber component such as CR, a compound ingredient containing CB and kneading the thus produced product to obtain an uncrosslinked rubber composition, and thereafter heating and pressurizing the uncrosslinked rubber composition to crosslink the rubber component.

The rubber composition according to the embodiment used to form a power transmission belt allows the power transmission belt to have excellent durability and excellent transmission efficiency. Thus, the rubber composition can be suitably used as a material for forming at least a part of a belt body of a power transmission belt, in particular, a variable speed belt.

(V-Ribbed Belt B)

Next, a V-ribbed belt B will be described as a power transmission belt formed partially using the rubber composition according to the embodiment.

Figure 2:
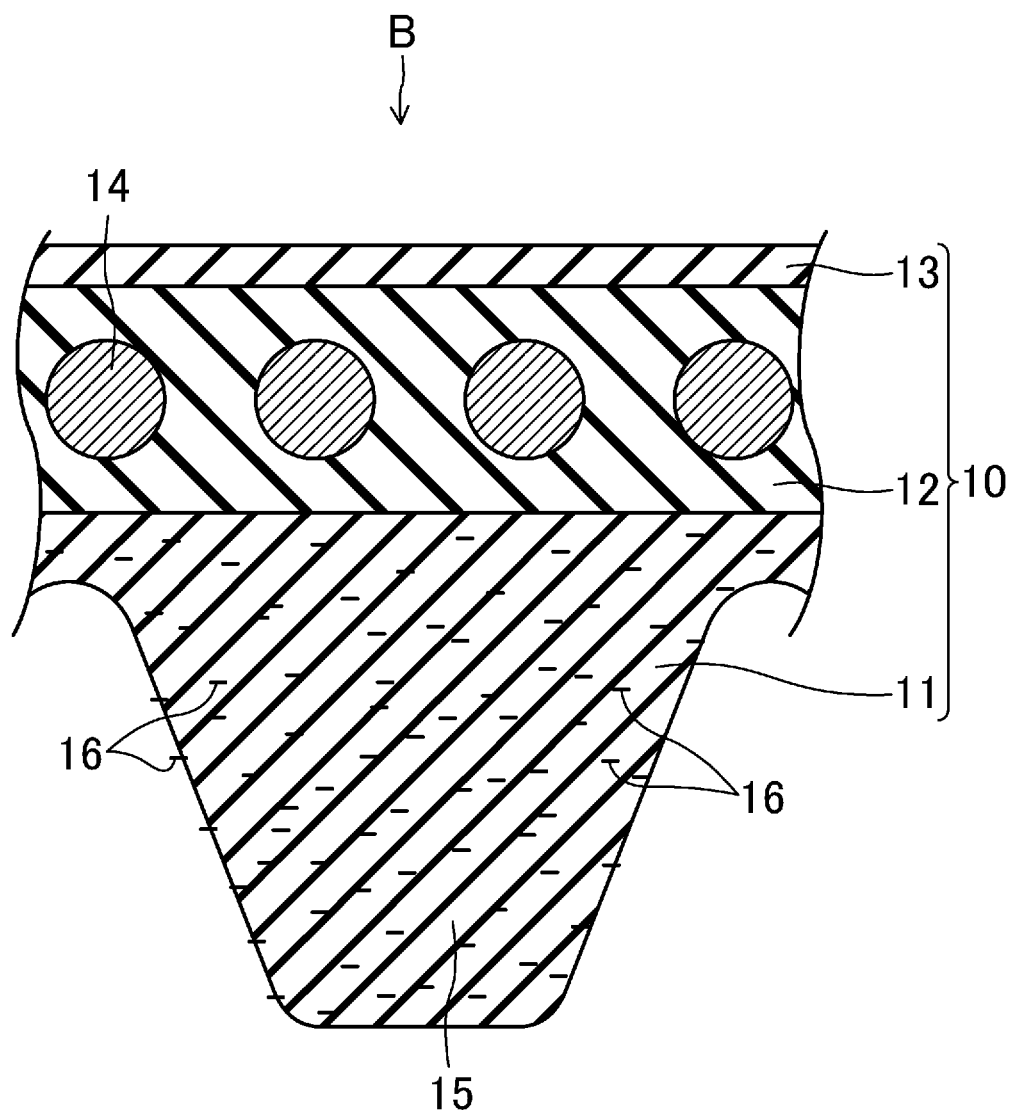
FIG. 2 is a cross-sectional view illustrating a main part of the V-ribbed belt according to the embodiment.

FIGS. 1 and 2 show a V-ribbed belt B according to the embodiment. The V-ribbed belt B according to the embodiment is, for example, an endless power transmission member used in an accessory drive belt transmission system provided in an engine compartment of an automobile. The V-ribbed belt B according to the embodiment has a length of 700 mm to 3000 mm, a width of 10 mm to 36 mm, and a thickness of 4.0 mm to 5.0 mm, for example.

The V-ribbed belt B according to the embodiment has a three-layered, rubber-made V-ribbed belt body 10 which includes a compressed rubber layer 11 (bottom rubber layer) forming a pulley contacting portion of an inner peripheral side of the belt, an intermediate adhesive rubber layer 12, and a backface rubber layer 13 forming an outer peripheral side of the belt. A cord 14 is embedded in a middle portion, in the belt thickness direction, of the adhesive rubber layer 12 of the V-ribbed belt body 10, such that the cord 14 forms a helical pattern having pitches in the belt width direction. Note that the backface rubber layer 13 may be replaced with a backface reinforcing fabric, and the compressed rubber layer 11 and the adhesive rubber layer 12 may form a two-layered V-ribbed belt body 10.

The compressed rubber layer 11 includes a plurality of V-shaped ribs 15 protruding from the inner peripheral side of the belt. The plurality of V-shaped ribs 15 are each in the shape of a rib extending in the longitudinal direction of the belt and having an approximately inverted triangular cross-section. The V-shaped ribs 15 are arranged parallel to one another in the belt width direction. Each of the V-shaped ribs 15 has, for example, a height of 2.0 mm to 3.0 mm, and an interval between proximal ends of adjacent ribs is 1.0 mm to 3.6 mm. The number of the V-shaped ribs 15 is 3 to 6 (6 ribs in FIG. 1), for example. The adhesive rubber layer 12 is in the shape of a strip having a horizontally elongated rectangular cross-section and has a thickness of 1.0 mm to 2.5 mm, for example. The backface rubber layer 13 is in the shape of a strip having a horizontally elongated rectangular cross-section and has a thickness of 0.4 mm to 0.8 mm, for example. Suitably, a surface of the backface rubber layer 13 has a woven fabric pattern in order to reduce noise generated during the backface driving.

The compressed rubber layer 11, the adhesive rubber layer 12, and the backface rubber layer 13 are formed of a rubber composition produced by heating and pressurizing an uncrosslinked rubber composition prepared by kneading a rubber component with various compound ingredients, and then crosslinking the kneaded product with a crosslinking agent. The respective rubber compositions for forming the compressed rubber layer 11, the adhesive rubber layer 12, and the backface rubber layer 13 may be the same as or different from one another.

At least one of the compressed rubber layer 11, the adhesive rubber layer 12, or the backface rubber layer 13 is formed of the rubber composition according to the present embodiment. It is preferred that at least the compressed rubber layer 11 is formed of the rubber composition according to the present embodiment. It is more preferred that all of the compressed rubber layer 11, the adhesive rubber layer 12, and the backface rubber layer 13 are formed of the rubber composition according to the present embodiment.

The cord 14 is made of a wire rod such as twisted yarn or braid yarn of polyethylene terephthalate (PET) fibers, polyethylene naphthalate (PEN) fibers, para-aramid fibers, vinylon fibers, and the like. The cord 14 undergoes, prior to the molding of the belt, an adhesion treatment of heating the cord 14 that has been soaked in an aqueous RFL solution and/or an adhesion treatment of drying the cord 14 that has been soaked in rubber cement, in order to impart adhesion to the V-ribbed belt body 10. The cord 14 may undergo, prior to the adhesion treatment by the aqueous RFL solution and/or the rubber cement, an adhesion treatment of heating the cord 14 that has been soaked in an adhesive solution containing an epoxy resin and a polyisocyanate resin, if necessary. The cord 14 has a diameter of 0.5 mm to 2.5 mm, for example. The distance between the centers of the neighboring cords 14 in a cross-section is 0.05 mm to 0.20 mm, for example.

(Method for Producing V-Ribbed Belt B)

A method for producing the V-ribbed belt B according to the embodiment will be described with reference to FIGS. 3 to 8.

Figure 3:
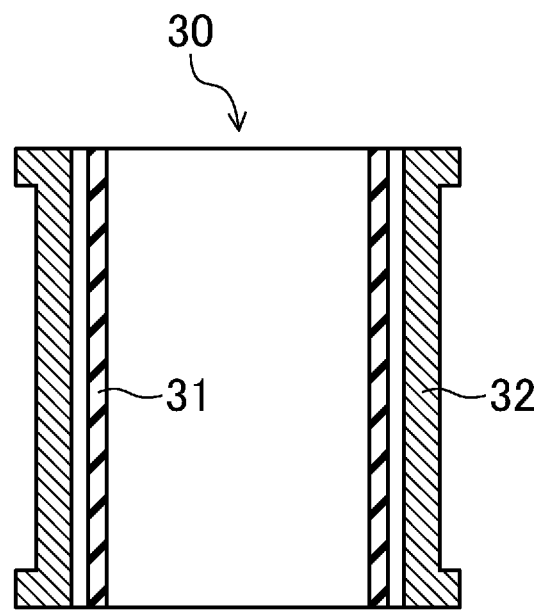
FIG. 3 is a first drawing for explaining a method for producing the V-ribbed belt according to the embodiment.
Figure 4:
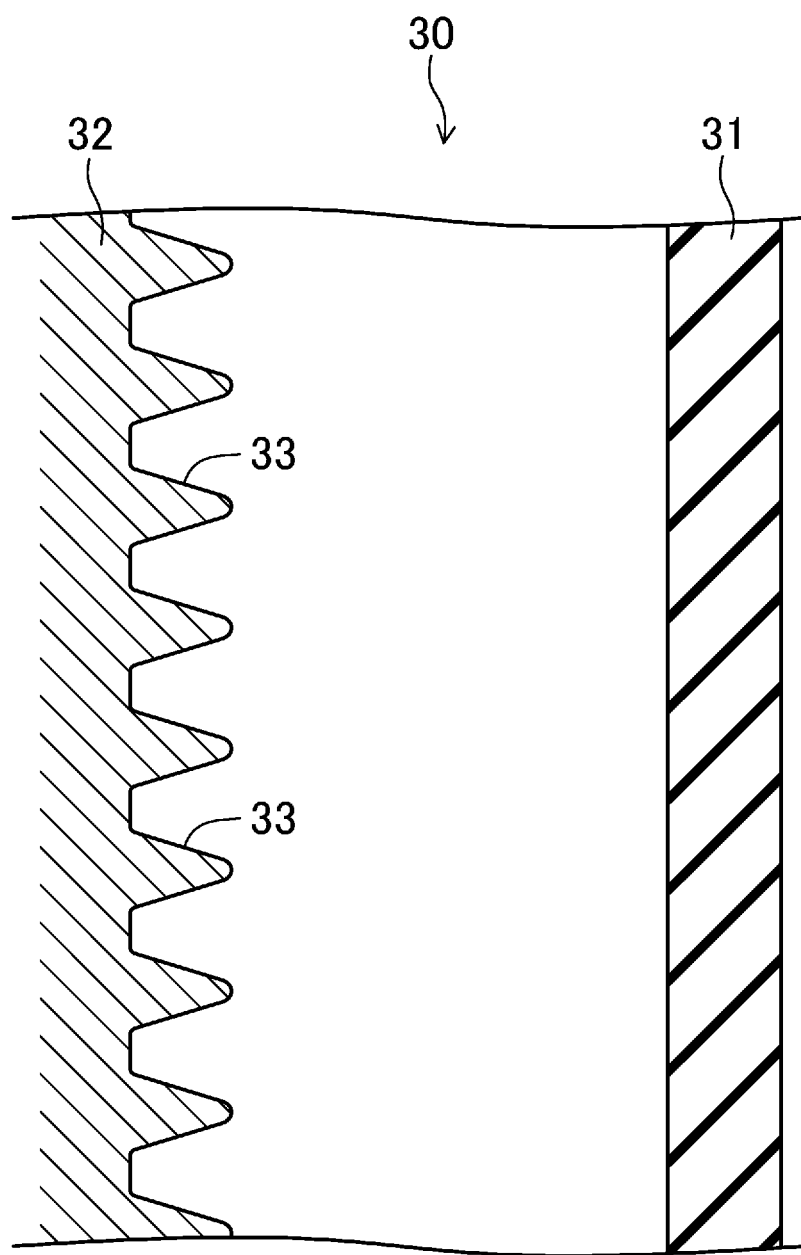
FIG. 4 is a second drawing for explaining a method for producing the V-ribbed belt according to the embodiment.

FIGS. 3 and 4 show a belt forming mold 30 used in production of a V-ribbed belt B according to the embodiment.

This belt forming mold 30 includes a cylindrical inner mold 31 and a cylindrical outer mold 32 which are concentric with each other.

The inner mold 31 is formed of a flexible material such as rubbers. The outer mold 32 is formed of a rigid material such as metals. An inner peripheral surface of the outer mold 32 serves as a molding surface and has V-shaped rib formation grooves 33 each having the same shape as that of the V-shaped rib 15 so as to be arranged at regular pitches in an axial direction. The outer mold 32 is provided with a temperature control mechanism which controls the temperature by allowing a heating medium, such as water vapor, or a cooling medium, such as water, to flow therein. The belt forming mold 30 is further provided with a pressurizing means which pressurizes the inner mold 31 from inside to expand.

A method for producing the V-ribbed belt B according to the embodiment includes a material preparation step, a shaping step, a crosslinking step, and a finishing step.

<Material Preparation Step>

Uncrosslinked rubber sheets 11', 12', and 13' to be the compressed rubber layer, the adhesive rubber layer, and the backface rubber layer Among uncrosslinked rubber sheets 11', 12', and 13' to be the compressed rubber layer, the adhesive rubber layer, and the backface rubber layer, respectively, the one containing cellulose nanofibers is formed in the following manner.

First, cellulose nanofibers are added to a rubber component which is being masticated, and the mixture is then kneaded to disperse the cellulose nanofibers in the rubber component.

Examples of a method for dispersing cellulose nanofibers in the rubber component include: adding a dispersion (gel) obtained by dispersing the cellulose nanofibers in water, to a rubber component which is being masticated by open rolls, and vaporizing moisture from the mixture while keeping the kneading of the dispersion and the rubber component; adding, to a rubber component which is being masticated, a master batch of cellulose nanofibers and rubber obtained by mixing a dispersion (gel), obtained by dispersing the cellulose nanofibers in water, and rubber latex and vaporizing moisture from the mixture; adding, to a rubber component which is being masticated, a master batch of cellulose nanofibers and rubber obtained by mixing a dispersion which is obtained by dispersing cellulose nanofibers in a solvent, and a solution which is obtained by dissolving a rubber component in a solvent, and vaporizing the solvents from the mixture; adding, to a rubber component which is being masticated, a final product obtained by freeze-drying and powdering a dispersion (gel) obtained by dispersing cellulose nanofibers in water; and adding a hydrophobized cellulose nanofibers to a rubber component which is being masticated.

Next, various compound ingredients are added to the mixture of the rubber component and the cellulose nanofibers while the mixture is kneaded, and the kneading is continuously performed. The uncrosslinked rubber composition is prepared in this manner.

The obtained uncrosslinked rubber composition is shaped into a sheet by calendering, for example.

The uncrosslinked rubber sheet containing no cellulose nanofibers is formed by adding various kinds of compound ingredients to the rubber component, kneading the mixture with a kneading machine such as a kneader or a Banbury mixer, and shaping the uncrosslinked rubber composition thus obtained into a sheet by calendering or the like.

Cord 14'

The cord 14' undergoes an adhesion treatment. Specifically, the cord 14' undergoes an RFL adhesion treatment in which the cord 14' is soaked in an aqueous RFL solution and heated. Suitably, the cord 14' undergoes, prior to the RFL adhesion treatment, a primary coat adhesion treatment in which the cord 14' is soaked in a primary coat adhesion treatment fluid and heated. The cord 14' may undergo, prior to the RFL adhesion treatment, a rubber cement adhesion treatment in which the cord 14' is soaked in rubber cement and dried.

<Shaping Step>

Figure 5:
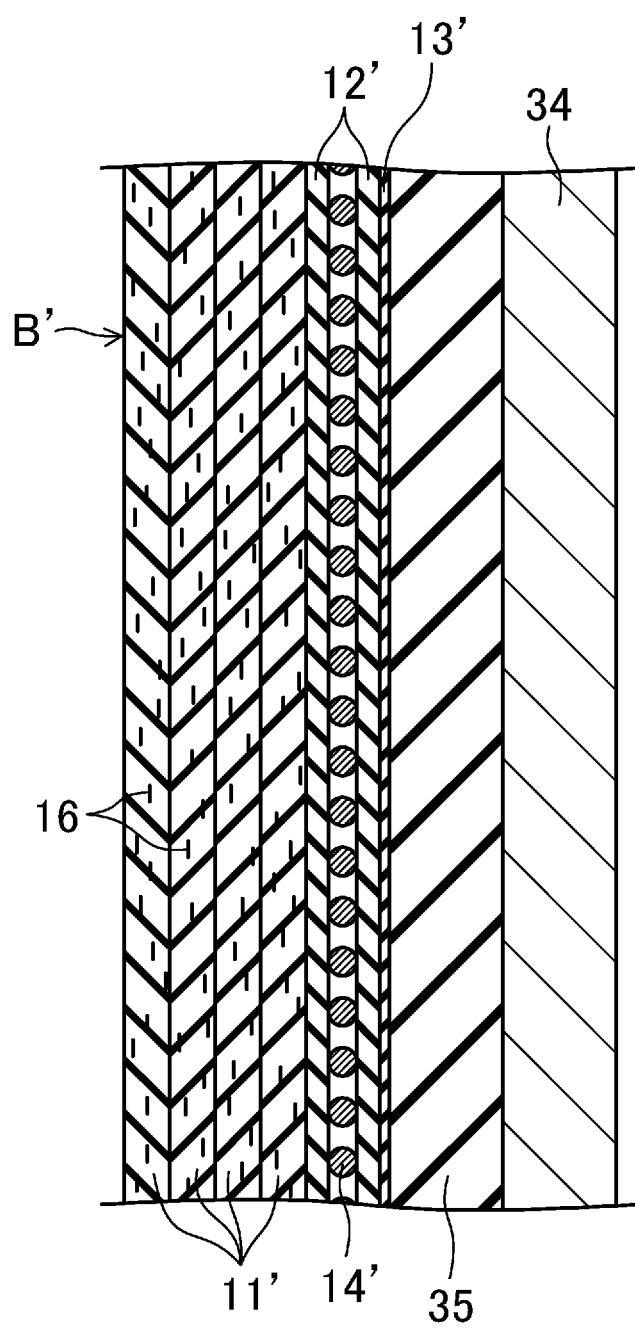
FIG. 5 is a third drawing for explaining a method for producing the V-ribbed belt according to the embodiment.

As shown in FIG. 5, a rubber sleeve 35 is placed on a cylindrical drum 34 having a smooth surface to cover the cylindrical drum 34. Then, the uncrosslinked rubber sheet 13' to be the backface rubber layer and the uncrosslinked rubber sheet 12' to be the adhesive rubber layer are sequentially stacked on and wrapped around the outer periphery of the rubber sleeve 35. After that, the cord 14' is wrapped helically around the cylindrical inner mold 31. Further, another uncrosslinked rubber sheet 12' to be the adhesive rubber layer and the uncrosslinked rubber sheet 11' to be the compressed rubber layer are sequentially wrapped around. Thus, a layered body B' is formed on the rubber sleeve 35.

<Crosslinking Step>

Figure 6:
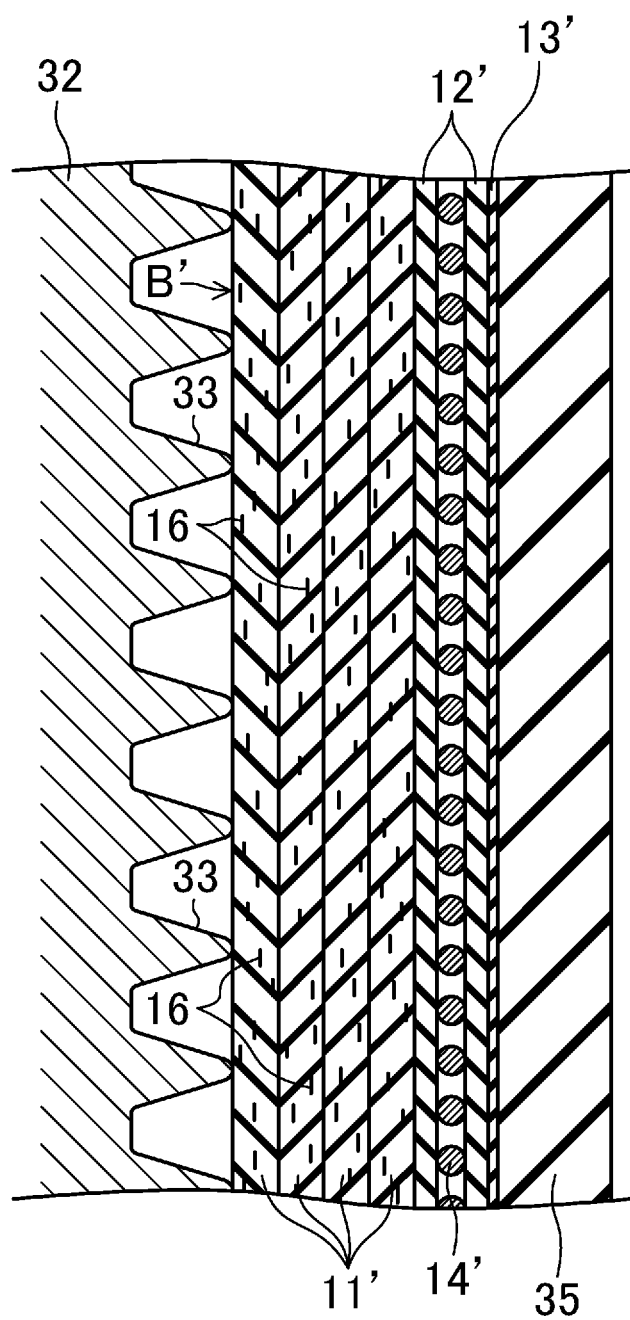
FIG. 6 is a fourth drawing for explaining a method for producing the V-ribbed belt according to the embodiment.
Figure 7:
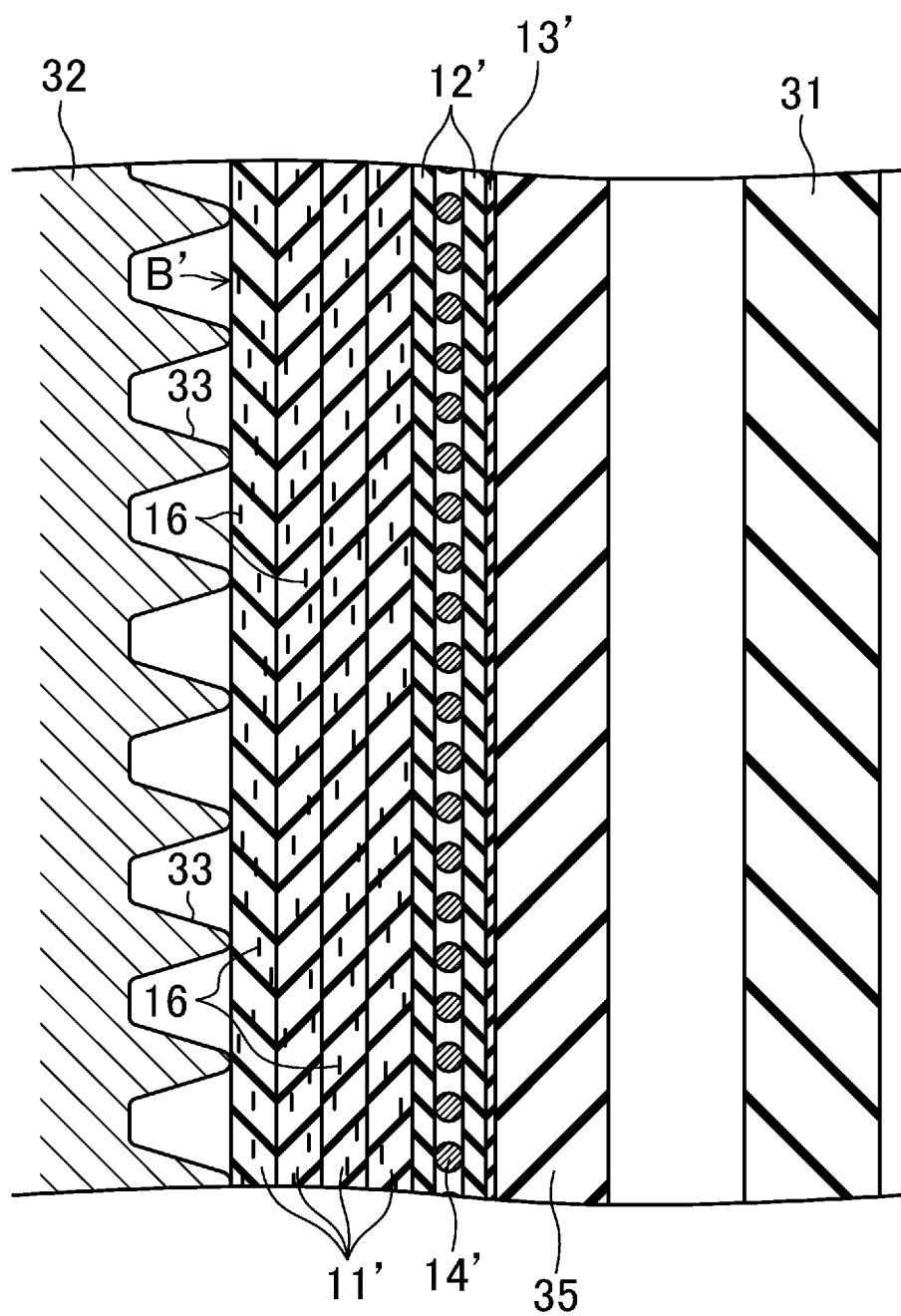
FIG. 7 is a fifth drawing for explaining a method for producing the V-ribbed belt according to the embodiment.

The rubber sleeve 35 having the layered body B' is removed from the cylindrical drum 34 and is then fitted to the inner peripheral side of the outer mold 32 as shown in FIG. 6. Thereafter, as shown in FIG. 7, the inner mold 31 is placed inside the rubber sleeve 35 set in the outer mold 32, and hermetically sealed.

Figure 8:
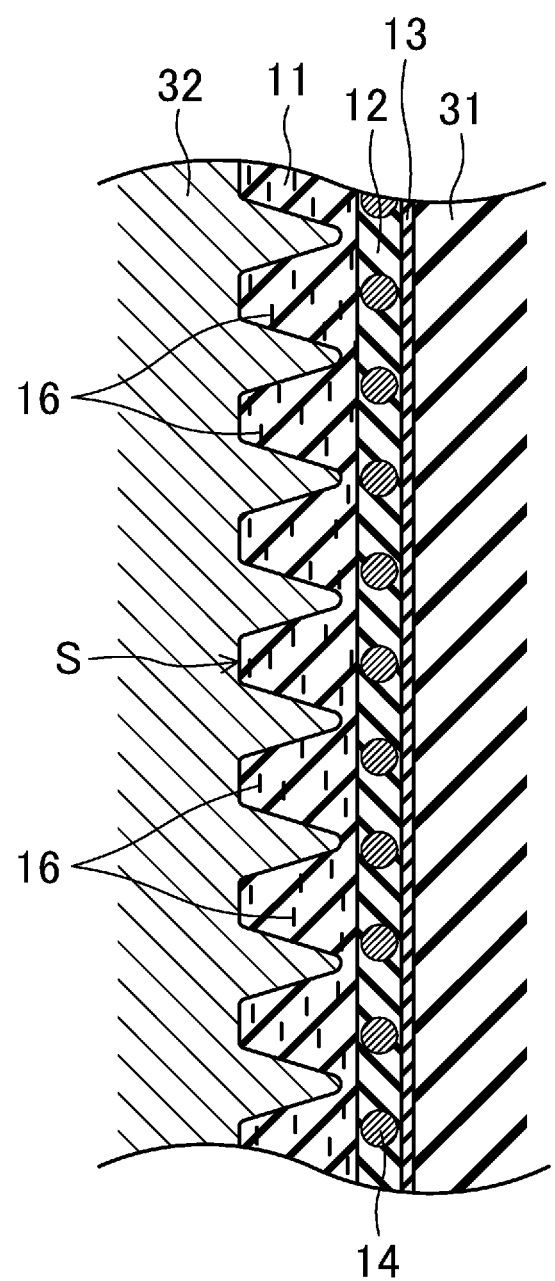
FIG. 8 is a sixth drawing for explaining a method for producing the V-ribbed belt according to the embodiment.

Subsequently, the outer mold 32 is heated, and the hermetically-sealed inner space of the inner mold 31 is pressurized by, for example, high-pressure air introduced therein. Here, the inner mold 31 expands, and the uncrosslinked rubber sheets 11', 12', and 13' of the layered body B' are pressed on the molding surface of the outer mold 32. At the same time, cross-linking is promoted in the sheets, and the sheets are integrated and combined with the cord 14'. A cylindrical belt slab S is formed as a result, as shown in FIG. 8. The belt slab S is molded at a temperature of 100° C. to 180° C., for example, under a pressure of 0.5 MPa to 2.0 MPa, for example, for a molding time of 10 minutes to 60 minutes, for example.

<Finishing Step>

Next, the inner space of the inner mold 31 is depressurized to relieve the sealing, and the belt slab S formed between the inner mold 31 and the outer mold 32 with the rubber sleeve 35 is removed. The belt slab S is then cut into rings of a predetermined width, and turned inside out, thereby obtaining the V-ribbed belts B.

(Flat Belt C)

Next, a flat belt will be described as another power transmission belt formed partially using the rubber composition according to the embodiment.

Figure 9:
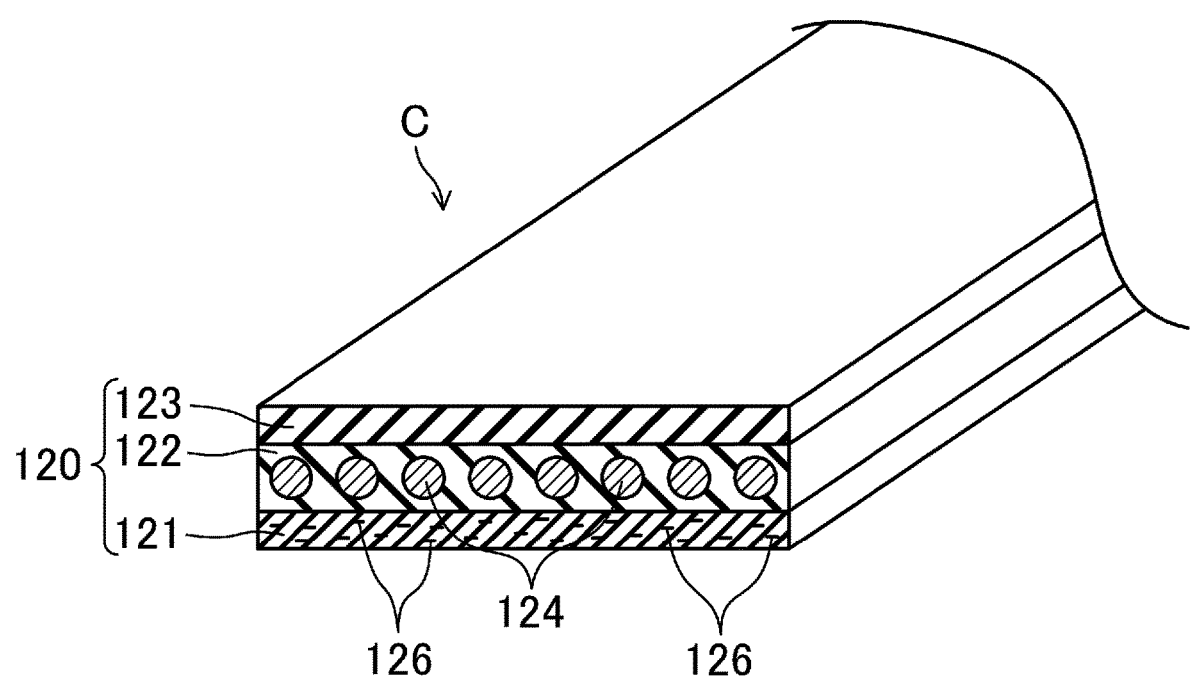
FIG. 9 is a perspective view schematically illustrating a flat belt according to the embodiment.

FIG. 9 schematically illustrates a flat belt C according to the present embodiment. The flat belt C is a power transmission member used in power transmission applications such as an air blower and a compressor and applications required to be long-life in use under relatively high-load conditions such as accessory drive applications of automobiles. The flat belt C has a length of 600 mm to 3000 mm, a width of 10 mm to 20 mm, and a thickness of 2 mm to 3.5 mm, for example.

The flat belt C includes a flat belt body 120 obtained by stacking and integrating an inner rubber layer 121 on the inner peripheral side of the belt, an adhesive rubber layer 122 on the outer peripheral side of the belt, and an outer rubber layer 123 on the outer peripheral side of the belt. A Cord 124 is embedded in a middle portion, in the belt thickness direction, of the adhesive rubber layer 122, such that the cord 124 forms a helical pattern having pitches in the belt width direction.

Each of the inner rubber layer 121, the adhesive rubber layer 122, and the outer rubber layer 123 is formed in the shape of a stripe having a horizontally elongated rectangular cross-section and is formed of a rubber composition produced by heating and pressurizing an uncrosslinked rubber composition prepared by adding various kinds of compound ingredients to a rubber component and kneading the mixture, and crosslinking the kneaded product with a crosslinking agent. The thickness of the inner rubber layer 121 is preferably 0.3 mm or more, more preferably 0.5 mm or more and preferably 3.0 mm or less, more preferably 2.5 mm or less. The thickness of the adhesive rubber layer 122 is, for example, 0.6 mm to 1.5 mm. The thickness of the outer rubber layer 123 is, for example, 0.6 mm to 1.5 mm.

At least one of the resin rubber compositions for forming the inner rubber layer 121, the adhesive rubber layer 122, and the outer rubber layer 123 is the rubber composition according to the present embodiment. It is preferred that at least the inner rubber layer 121 is formed of the rubber composition according to the present embodiment. It is more preferred that all of the inner rubber layer 121, the adhesive rubber layer 122, and the outer rubber layer 123 are formed of the rubber composition according to the present embodiment.

The cord 124 has the same configuration as the cord 14 of the V-ribbed belt according to the present embodiment.

In the flat belt C according to the present embodiment, at least one of the rubber compositions for forming the inner rubber layer 121, the adhesive rubber layer 122, and the outer rubber layer 123 forming the belt body 120 contains cellulose nanofibers having a fiber diameter distribution range of 50 nm to 500 nm as described above. This allows the flat belt C to have excellent resistance to flex fatigue. In particular, when the rubber composition for forming the inner rubber layer 121 which forms the contact portion contains such cellulose nanofibers, a stable friction coefficient together with high wear resistance can be obtained.

(Method for Producing Flat Belt C)

A method for producing the flat belt C will be described with reference to FIGS. 10, 11, and 12. A method for producing the flat belt C includes a material preparation step, a shaping step, a crosslinking step, and a finishing step.

<Material Preparation Step>

Among the uncrosslinked rubber sheets 121', 122', and 123' to be the inner rubber layer, the adhesive rubber layer, and the outer rubber layer, the one containing cellulose nanofibers is formed in the same manner as in the case of the V-ribbed belt. The uncrosslinked rubber sheet containing no cellulose nanofibers is formed by adding various kinds of compound ingredients to the rubber component, kneading the mixture with a kneading machine such as a kneader or a Banbury mixer, and shaping the uncrosslinked rubber composition thus obtained into a sheet by calendering or the like.

A cord 124' undergoes an adhesion treatment in the same manner as in the case of the V-ribbed belt.

<Shaping Step>

Figure 10A:
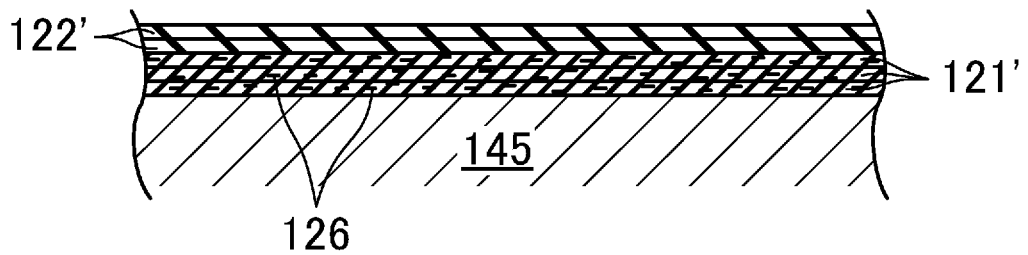
FIGS. 10A to 10C are first drawings for explaining a method for producing the flat belt according to the embodiment.

As shown in FIG. 10A, an uncrosslinked rubber sheet 121' to be an inner rubber layer is wrapped around the outer periphery of a cylindrical mold 145. Then, an uncrosslinked rubber sheet 122' for forming an adhesive rubber layer is wrapped around.

Figure 10B:
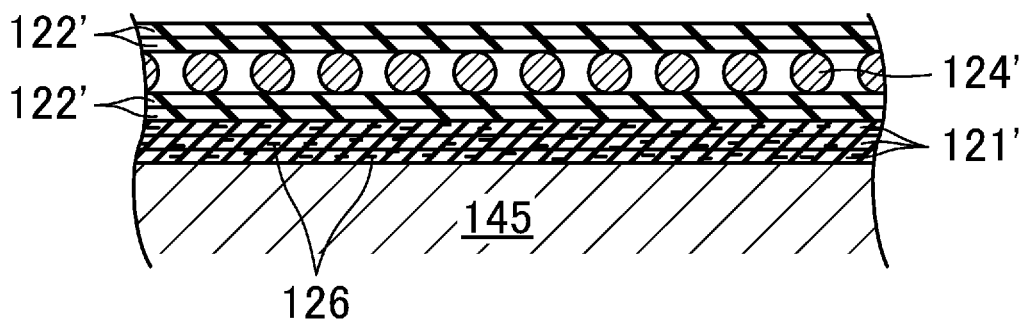

Thereafter, as shown in FIG. 10B, the cord 124' is wrapped helically around the uncrosslinked rubber sheet 122' which is to be an adhesive rubber layer. Then, another uncrosslinked rubber sheet 122' to be an adhesive rubber layer is again wrapped around.

Figure 10C:
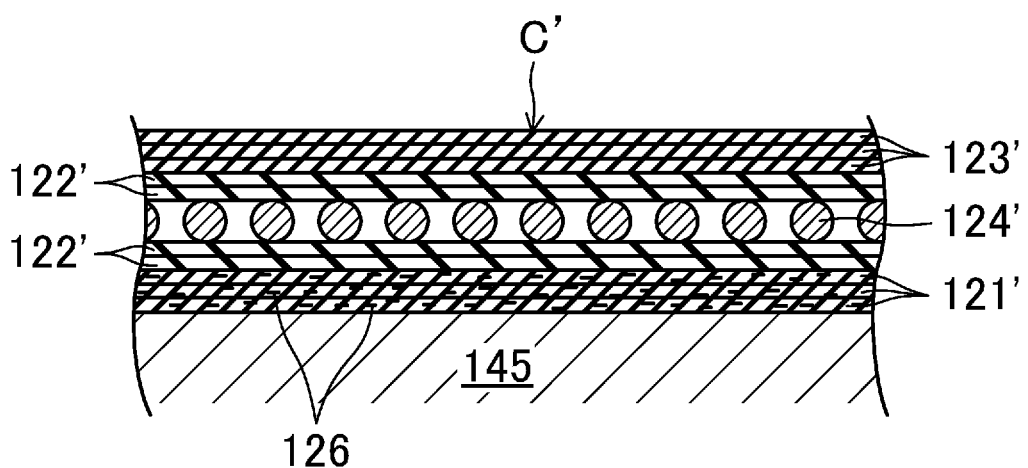

Subsequently, as shown in FIG. 10C, an uncrosslinked rubber sheet 123' to be an outer rubber layer is wrapped around the uncrosslinked rubber sheet 122' which is to be an adhesive rubber layer. Thus, a layered body C' is formed on the cylindrical mold 145.

<Crosslinking Step>

Figure 11:
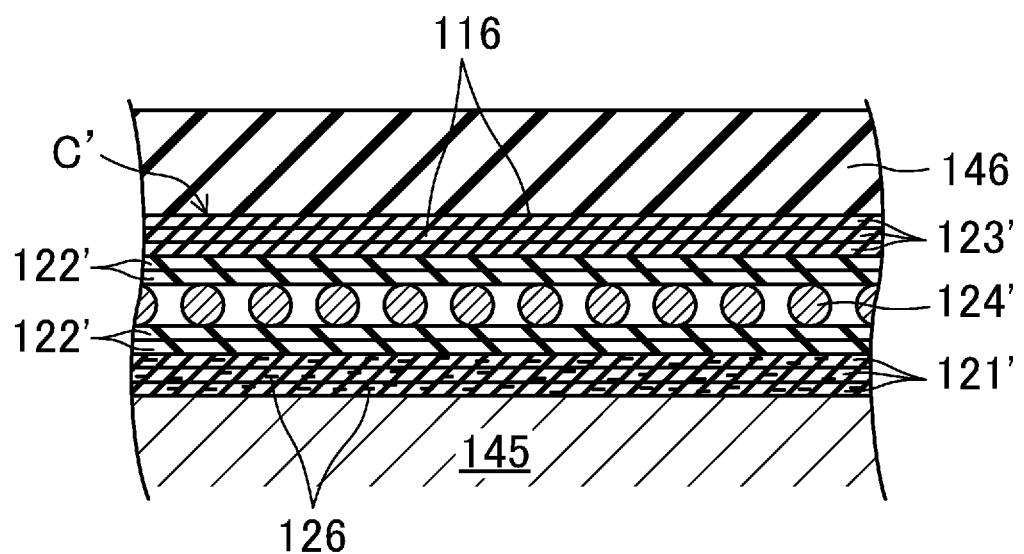
FIG. 11 is a second drawing for explaining a method for producing the flat belt according to the embodiment.
Figure 12:
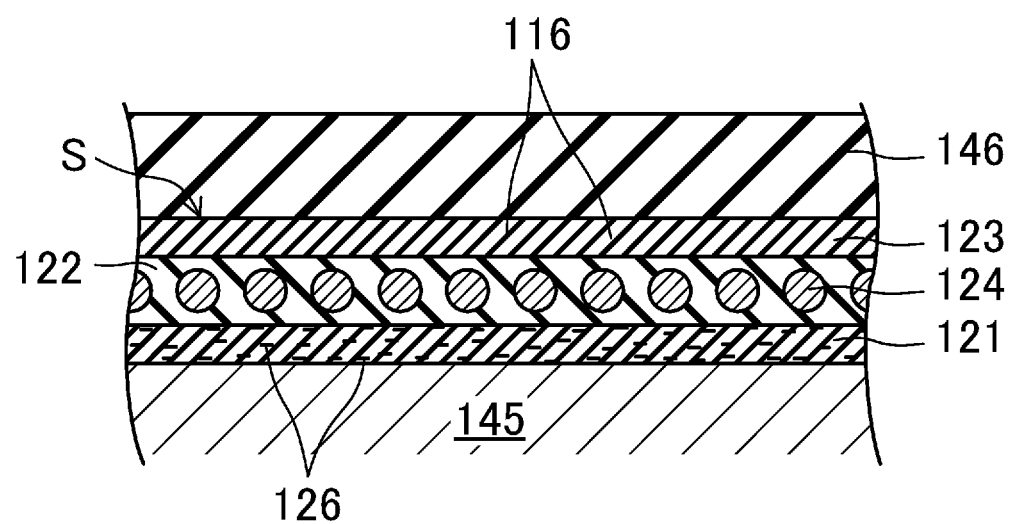
FIG. 12 is a third drawing for explaining a method for producing the flat belt according to the embodiment.

Subsequently, as shown in FIG. 11, a rubber sleeve 146 is placed on the layered body C', which is on the cylindrical mold 145. The layered body C' with the rubber sleeve 146 is then placed in a vulcanizer, and the vulcanizer is sealed. The cylindrical mold 145 is heated by high-temperature steam or the like and pressurized by applying a high pressure to press the rubber sleeve 146 in a radial direction of the cylindrical mold 145. In this procedure, the uncrosslinked rubber composition of the layered body C' flows, and the crosslinking reaction of the rubber component proceeds, and in addition, the bonding reaction of the cord 124' proceeds. Accordingly, a cylindrical belt slab S is formed on the cylindrical mold 145 as shown in FIG. 12.

<Polishing and Finishing Step>

In the polishing step, the cylindrical mold 145 is taken out from the vulcanizer, a cylindrical belt slab S formed on the cylindrical mold 145 is removed, and the outer peripheral surface and/or the inner peripheral surface of the belt slab S is polished to have a uniform thickness.

Finally, the belt slab S is cut into pieces having a predetermined width. Thus, the flat belts C are produced.

(Cogged Belt)

Next, a cogged belt will be described as yet another power transmission belt formed partially using the rubber composition according to the embodiment.

Figure 13:
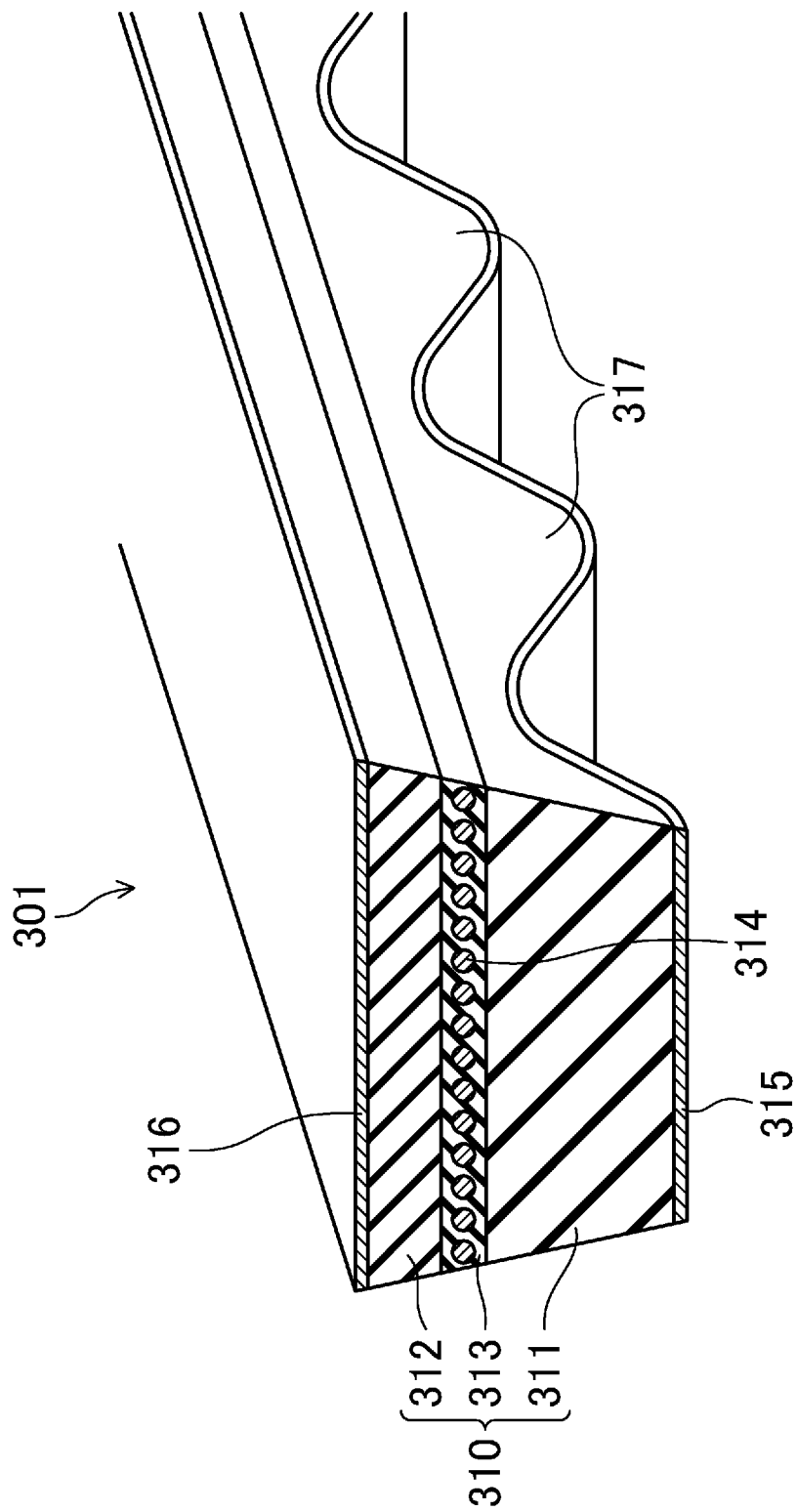
FIG. 13 is a perspective view schematically illustrating a single-cogged V-belt according to the embodiment.

FIG. 13 is a drawing schematically illustrating a raw-edge, single-cogged V-belt 301 according to the present embodiment. Such a single-cogged V-belt is used, for example, as a variable speed belt for a small scooter or an agricultural machine.

The single-cogged V-belt 301 includes a rubber belt body 10 that is obtained by stacking and integrating a compressed rubber layer 311 on the inner peripheral side of the belt, the stretch rubber layer 312 on the outer peripheral side of the belt, and an adhesive rubber layer 313 therebetween, and has a trapezoidal cross-section. A cord 314 is embedded in a middle portion, in the belt thickness direction, of the adhesive rubber layer 313, such that the cord 314 forms a helical pattern having pitches in the belt width direction. An inside reinforcing fabric 315 is attached to the surface of the compressed rubber layer 311 forming the inner peripheral surface of the belt. An outside reinforcing fabric 316 is attached to the surface of the stretch rubber layer 312 forming the outer peripheral surface of the belt. Inner cogs 317 are disposed on the inner peripheral side of the belt at regular pitches in a belt length direction, and a flat belt backface is formed on the outer peripheral side of the belt.

In such a single-cogged V-belt 301, at least one of the compressed rubber layer 311, the stretch rubber layer 312, or the adhesive rubber layer 313, forming the belt body 310 is composed of the rubber composition according to the embodiment. It is preferred that at least the compressed rubber layer 311 is formed of the rubber composition according to the present embodiment. It is more preferred that all of the compressed rubber layer 311, the stretch rubber layer 312, and the adhesive rubber layer 313 are formed of the rubber composition according to the present embodiment.

The cord 314 has the same configuration as the cord 14 of the V-ribbed belt according to the present embodiment.

In the single-cogged V-belt 301 according to the present embodiment, at least one of the compressed rubber layer 311, the stretch rubber layer 312, or the adhesive rubber layer 313 contains cellulose nanofibers having a fiber diameter distribution range of 50 nm to 500 nm. This allows the single-cogged V-belt to have excellent resistance to flex fatigue.

(Other Belts)

Although the V-ribbed belt B and the flat belt C are described above, the present invention is not limited thereto, and other power transmission belts may also be used. FIG. 14 shows a raw-edge V-belt 401 and a wrapped V-belt 402 that are friction power transmission belts and a toothed belt 403 that is a synchronous power transmission belt. Each of these belts includes a belt body 410, a cord 414, and reinforcing fabric 415. The entire belt body 410 or a part of the belt body 410 may be formed of the rubber composition according to the present embodiment.

EXAMPLES

Belts of the examples and the comparative examples were produced using the rubber composition according to the embodiment, which contains a chloroprene rubber (CR) as a rubber component. The kind of the belts was a raw-edge, single-cogged V-belt shown in FIG. 13.

(Preparation of TEMPO-Oxidized Cellulose Nanofibers)

In order to prepare TEMPO-oxidized cellulose nanofibers, cellulose nanofibers were prepared. First, TEMPO oxidation was performed. Specifically, bleached softwood kraft pulps were washed with a sufficient amount of HCl (0.1M) and ion-exchange water. Then, 400 g of the washed pulps (solid content: 13%) obtained as described above was mixed with 4000 ml of ion-exchange water. To the mixture thus obtained, 0.78 g of 2,2,6,6-tetramethylpiperidine-1-oxyl (TEMPO) (Tokyo Kasei Kogyo Co., Ltd.) and 5.0 g of NaBr were added, and the mixture was then stirred for 1 hour.

Subsequently, 125 ml of NaClO (2M) was added to the mixture. Further, NaOH (0.5M) was added dropwise to the mixture while checking the pH. In this procedure, the pH changed by the reaction was maintained at 10.0 by dropwise addition of NaOH. At the time when there was no change in pH, the addition of NaOH was stopped, and the mixture was stirred for one more hour. Thereafter, the pulp mixture was filtered, and the filter cake was washed with ion-exchange water a plurality of times.

Then, the washed filter cake was defibrated. The pulps obtained by the TEMPO oxidation (washed filter cake) and ion-exchanged water were mixed to have a solid content of 1 wt % and then subjected to preliminary dispersion with a bead mill.

The dispersion thus obtained was subjected to defibration treatment four times at 150 MPa using a Starburst (manufactured by Sugino Machine Co., Ltd.) which is a wet fine pulverization apparatus. Thus, TEMPO-oxidized CNFs were obtained.

(Production of Belt)

The TEMPO-oxidized CNFs obtained in the above manner were used to produce various kinds of single-cogged V-belt for test evaluation. A common method for producing these belts is as follows.

The TEMPO-oxidized CNFs obtained above and CR latex (manufactured by Tosoh Corporation) were mixed and placed in a beaker. The mixture was then stirred at 600 rpm for about four hours by a propeller-type stirrer of six paddle blades of φ100. The dispersion liquid after the stirring was air-dried in an atmosphere at 50° C. to prepare a master batch. Subsequently, sulfur-modified chloroprene (CR) was masticated, the master batch was then added to the CR, and the mixture was kneaded. The amount of the master batch to be added to the CR was determined so that the content of the cellulose fine fibers became predetermined parts by mass relative to 100 parts by mass of the total CR.

Next, the CR and cellulose fine fibers were kneaded with an internal mixer, and the mixture and compound ingredients were further kneaded. As the compound ingredients, relative to 100 parts by mass of the rubber component, 20 parts by mass of carbon black FEF (Seast SO manufactured by Tokai Carbon Co., Ltd.) as a reinforcing material; 20 parts by mass of aramid short fibers; 5 parts by mass of oil (SUMPAR 2280 (trade name) manufactured by Japan Sun Oil Company, Ltd.); 5 parts by mass of zinc oxide (manufactured by Sakai Chemical Industry Co., Ltd.) as a vulcanization accelerator aid; and 4 parts by mass of magnesium oxide (KYOWAMAG 150 (trade name) manufactured by Kyowa Chemical Industry Co., Ltd.) were added, and the kneading is continuously performed. Thus, an uncrosslinked rubber composition was produced.

The above formulation is shown in Table 1. As will also be described below, belts for evaluation were produced using various amounts of CNFs and short fibers.

This uncrosslinked rubber composition was formed into a sheet, and the sheet was used as an uncrosslinked rubber sheet for forming a bottom rubber layer of each belt. Then, single-cogged V-belts for test evaluation were produced.

TABLE 1

| | |
|---|---|
| CR | 100 |
| TEMPO-OXIDIZED CNF | VARIOUS AMOUNTS |
| SHORT FIBER | VARIOUS AMOUNTS |
| CB FEF | 20 |
| OIL | 5 |
| ZINC OXIDE | 5 |
| MAGNESIUM OXIDE | 4 |

(Transmission Efficiency of Belts)

The diameters of the CNFs and the short fibers to be added were different in each of the above-descried single-cogged V-belts for test evaluation. That is, five kinds of CNFs having average diameters of 2 nm, 10 nm, 20 nm, 50 nm, and 100 nm were used. Further, five kinds of short fibers having average diameters of 2 µm, 8 µm, 15 µm, 25 µm, and 50 µm were used. With these combinations, belts Nos. 1 to 25 for evaluation shown in Table 2 were produced. The amount of the CNFs to be added was 10 parts by mass, and the amount of short fibers to be added was 15 parts by mass, relative to 100 parts by mass of the CR.

Figure 15:
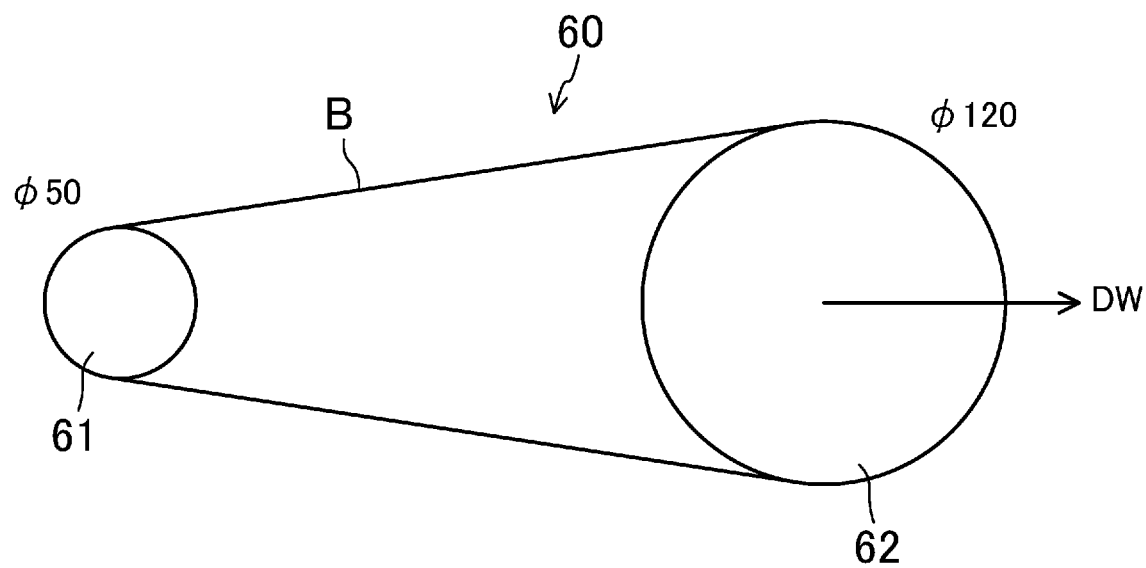
FIG. 15 is a drawing schematically illustrating a running tester for measuring transmission efficiency of the power transmission belt.

These belts Nos. 1 to 25 for evaluation were evaluated for transmission efficiency. FIG. 15 is a drawing schematically illustrating a running tester 60 for measuring transmission efficiency of the belt according to the present embodiment. The running tester 60 includes a drive pulley 61 having a pulley diameter of 50 mm and a driven pulley 62 having a pulley diameter of 120 mm, and the belt B for evaluation is wrapped around these pulleys. A dead weight of 600 N is applied to the driven pulley 62, and at a temperature of 40° C., the drive pulley 61 is rotated at 5000 rpm. In this procedure, the energy output from the driven pulley 62 is measured with respect to the energy input to the drive pulley 61, and the transmission efficiency is calculated. Table 2 shows an index of each calculated efficiency as a belt efficiency index.

TABLE 2

| NO. | CNF DIAMETER (nm) | SHORT FIBER DIAMETER (µm) | BELT EFFICIENCY INDEX |
|---|---|---|---|
| 1 | 2 | 2 | 35 |
| 2 | 2 | 8 | 135 |
| 3 | 2 | 15 | 132 |
| 4 | 2 | 25 | 135 |
| 5 | 2 | 50 | 55 |
| 6 | 10 | 2 | 32 |
| 7 | 10 | 8 | 138 |
| 8 | 10 | 15 | 130 |
| 9 | 10 | 25 | 135 |
| 10 | 10 | 50 | 62 |
| 11 | 20 | 2 | 25 |
| 12 | 20 | 8 | 120 |
| 13 | 20 | 15 | 115 |
| 14 | 20 | 25 | 118 |
| 15 | 20 | 50 | 25 |
| 16 | 50 | 2 | 20 |
| 17 | 50 | 8 | 76 |
| 18 | 50 | 15 | 72 |
| 19 | 50 | 25 | 74 |
| 20 | 50 | 50 | 20 |
| 21 | 100 | 2 | 15 |
| 22 | 100 | 8 | 38 |
| 23 | 100 | 15 | 35 |
| 24 | 100 | 25 | 33 |
| 25 | 100 | 50 | 21 |

(Evaluation of Transmission Efficiency of Belts)

As shown in Table 2, regardless of the diameters of the CNFs, the belts (Nos. 2 to 4, 7 to 9, 12 to 15, 17 to 19, and 22 to 24) having diameters of the short fibers of 8 µm, 15 µm, and 25 µm were excellent in belt efficiency index compared with the belts having diameters of the short fibers of 2 µm and 50 µm. Further, the belt efficiency indexes of the belts (Nos. 22 to 24) having diameters of CNFs of 100 nm were improved according to the difference in diameters of the short fibers. The belt efficiency indexes of the belts (Nos. 17 to 19) having diameters of CNFs of 50 nm were significantly improved according to the difference in diameters of the short fibers. The belt efficiency indexes of the belts (Nos. 2 to 4, 7 to 9, and 12 to 15) having diameters of CNFs of 20 nm, 10 nm, and 5 nm were quite significantly improved according to the difference in diameters of the short fibers.

As described above, the diameters of the short fibers are preferably 5 μm or more, more preferably 8 μm or more. Moreover, the diameters of the short fibers are preferably 30 μm or less, more preferably 25 μm or less. In addition, the diameters of the CNFs are preferably 1 nm or more, more preferably 2 nm or more. Moreover, the diameters of the CNFs are preferably about 200 nm or less, more preferably 50 nm or less, yet more preferably 20 nm or less.

(Durability of Belts)

The amounts of the CNFs and the short fibers to be added were different in each of the above-described single-cogged V-belts for test evaluation. That is, for CNFs, five different amounts of CNFs to be added including 0 parts by mass (i.e., no addition), 1 part by mass, 5 parts by mass, 20 parts by mass, and 30 parts by mass were used relative to 100 parts by mass of the rubber component. Further, for short fibers, five different amounts of short fibers to be added including 0 parts by mass (no addition), 5 parts by mass, 10 parts by mass, 30 parts by mass, and 45 parts by mass were used relative to 100 parts by mass of the rubber component. Note that the belt of the case where the amount of the CNFs to be added and the amount of the short fibers to be added were both 0 parts by mass (no addition) was excluded. Accordingly, 24 kinds of belts No. 26 to 49 were produced. Here, the average diameter of the CNFs was 10 nm, and the average diameter of the short fibers was 10 μm.

These belt Nos. 26 to 49 were evaluated for wear resistance and flex fatigue as evaluation of durability.

Figure 16:
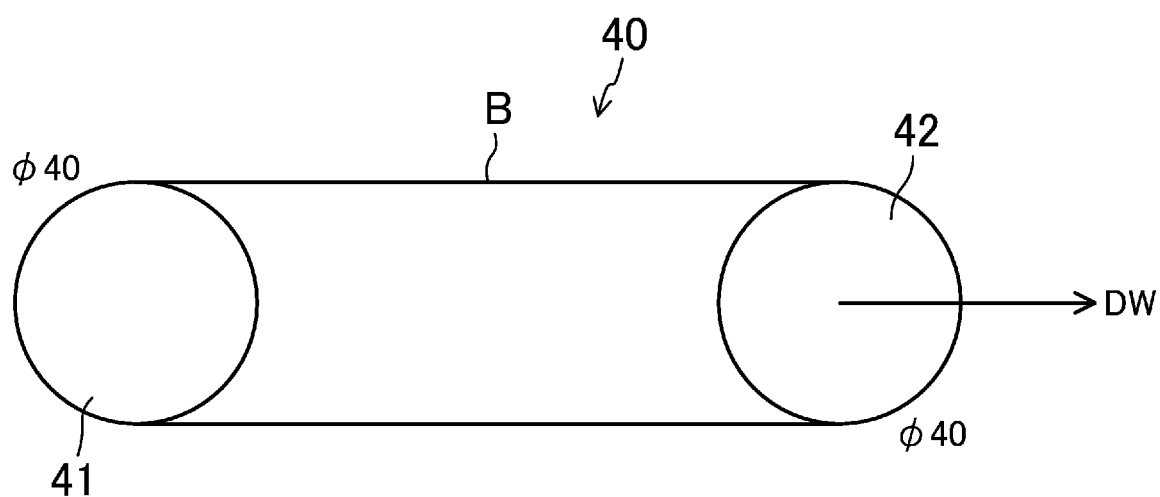
FIG. 16 is a drawing schematically illustrating a running tester for evaluating wear resistance and flex fatigue of belts.

FIG. 16 illustrates a running tester 40 for testing wear resistance and flex fatigue of belts. The running tester 40 includes a drive pulley 41 having a pulley diameter φ of 40 mm and a driven pulley 42 having a pulley diameter of 40 mm provided on the right side of the drive pulley 41. The driven pulley 42 is laterally movable such that tension can be imparted to the single-cogged V-belt B by applying an axial load (dead weight DW).

(Wear Resistance)

The belts (Nos. 26 to 49) for test evaluation were wrapped around the drive pulley 41 and the driven pulley 42 of the running tester 40, an axial load of 600 N was applied to the belts in the right side direction of the driven pulley 42 to impart a tension, and the belts were rotated at 3000 rpm by the drive pulley 41 at the ambient temperature of 40° C. to run the belts.

At the lapse of 24 hours of the running, the abrasion loss (the weight loss of each belt before and after the running) was measured. The smaller the numerical value is, the smaller the abrasion loss is, which is excellent. The results are shown in Table 3.

(Flex Fatigue)

The belts (Nos. 26 to 49) for test evaluation were wrapped around the drive pulley 41 and the driven pulley 42 of the running tester 40, an axial load of 600 N was applied to the belts in the right side direction of the driven pulley 42 to impart a tension, and the belts were rotated at 3000 rpm by the drive pulley 41 at the ambient temperature of 100° C. to run the belts. The running of each belt was stopped at fixed intervals, whether or not a crack appeared in each single-cogged V-belt B was visually checked, and the time period of belt running until a crack was visually observed was measured for evaluation of flex fatigue. That is, the larger the numerical value is, the more excellent the durability is. The results are shown in Table 3.

TABLE 3

| NO. | CNF (10 nm) | SHORT FIBER (10 μm) | BELT WEAR RESISTANCE | BELT FLEX FATIGUE |
|---|---|---|---|---|
| 26 | 0 | 5 | 590 | 65 |
| 27 | 0 | 10 | 390 | 67 |
| 28 | 0 | 30 | 208 | 46 |
| 29 | 0 | 45 | 188 | 18 |
| 30 | 1 | 0 | 560 | — |
| 31 | 1 | 5 | 125 | 125 |
| 32 | 1 | 10 | 115 | 118 |
| 33 | 1 | 30 | 102 | 108 |
| 34 | 1 | 45 | 79 | 70 |
| 35 | 5 | 0 | 240 | — |
| 36 | 5 | 5 | 106 | 120 |
| 37 | 5 | 10 | 100 | 100 |
| 38 | 5 | 30 | 85 | 105 |
| 39 | 5 | 45 | 71 | 65 |
| 40 | 20 | 0 | 120 | — |
| 41 | 20 | 5 | 95 | 105 |
| 42 | 20 | 10 | 80 | 95 |
| 43 | 20 | 30 | 75 | 90 |
| 44 | 20 | 45 | 75 | 32 |
| 45 | 30 | 0 | 205 | — |
| 46 | 30 | 5 | 180 | 95 |
| 47 | 30 | 10 | 189 | 35 |
| 48 | 30 | 30 | 177 | 20 |
| 49 | 30 | 45 | 162 | 5 |

(Evaluation of Durability of Belts)

The belts Nos. 26 to 29 containing no CNFs were inferior in wear resistance, and the wear resistance was improved by increasing the amount of the short fibers to be added. However, the wear resistance of the belt No. 29 containing 45 parts by mass of short fibers was 188, which was insufficient. Also, the flex fatigue was also low and was decreased as an increase in the amount of the short fibers to be added.

The belts Nos. 30, 35, 40, and 45 containing no short fibers could not run under the measurement condition of flex fatigue (ambient temperature of 100° C.). Accordingly, the flex fatigue of the belts Nos. 30, 35, 40, and 45 could not be measured. These belts could run under the measurement condition of wear resistance (ambient temperature of 40° C.). Accordingly, the wear resistance of these belts could be measured.

For the belts Nos. 30 to 34 in which the amount of CNFs to be added was 1 part by mass (relative to 100 parts by mass of the rubber component, hereinafter the same), the belt No. 30 containing no short fibers exhibited really bad wear resistance (560), whereas the belts Nos. 31 to 34 containing short fibers exhibited excellent wear resistance in the range of 79 to 125. Note that the belt No. 34 in which the amount of short fibers to be added was 45 parts by mass exhibited low flex fatigue of 70. The belts Nos. 31 to 33 in which the amounts of short fibers to be added were 5 parts by mass, 10 parts by mass, and 30 parts by mass exhibited excellent flex fatigue index of 108 to 125.

The belts Nos. 35 to 39 in which the amount of CNFs to be added was 5 parts by mass tended to be the same, and the belts Nos. 36 to 38 in which the amounts of short fibers to be added were 5 parts by mass, 10 parts by mass, and 30 parts by mass were excellent in both of wear resistance and excellent flex fatigue index. The belt No. 35 containing no short fibers was inferior in wear resistance, and the belt No. 39 in which the amount of short fibers to be added was 45 parts by mass was inferior in flex fatigue.

Among the belts Nos. 40 to 44 in which the amount of CNFs to be added was 5 parts by mass, the belts Nos. 41 to 43 in which the amounts of short fibers to be added were 5 parts by mass, 10 parts by mass, and 30 parts by mass were excellent in both of wear resistance and flex fatigue.

Among the belts Nos. 45 to 49 in which the amount of CNFs to be added was 30 parts by mass relative to 100 parts by mass of the rubber component, the belt in which the amount of short fibers to be added was 5 parts by mass exhibited flex fatigue of 95, which was relatively good, but exhibited wear resistance of 180, which was inferior. The wear resistance was improved to a certain degree, but the flex fatigue was significantly deteriorated, by increasing the amount of short fibers to be added.

As described above, the wear resistance is significantly improved by containing at least a small amount of CNFs and using short fibers (for example, comparison between the belts Nos. 26 and 31). Accordingly, the amount of CNFs to be added is preferably 0.5 parts by mass or more, more preferably 1 part by mass or more, relative to 100 parts by mass of the rubber component. When the amount of CNFs to be added is too large, the durability is deteriorated. Thus, the amount of the CNFs to be added is preferably 20 parts by mass or less, more preferably 10 parts by mass or less, relative to 100 parts by mass of the rubber component.

In addition, when CNFs are added, the wear resistance is significantly improved by using at least a small amount of short fibers (for example, comparison between the belts Nos. 30 and 31). Accordingly, the amount of short fibers to be added is preferably 1 part by mass or more, more preferably 5 parts by mass or more, relative to 100 parts by mass of the rubber component. When the amount of short fibers to be added is increased, the wear resistance is improved, but if the amount is too large, the flex fatigue is deteriorated. Accordingly, the amount of short fibers to be added is preferably 40 parts by mass or less, more preferably 30 parts by mass or less, relative to 100 parts by mass of the rubber component.

In the power transmission belt of the present disclosure, transmission efficiency and durability of the belt are both improved. Thus, the power transmission belt of the present disclosure is useful as various kinds of power transmission belts.

The invention claimed is:

1. A power transmission belt at least comprising a bottom rubber layer, wherein
    a rubber composition for forming the bottom rubber layer contains a rubber component, cellulose fine fibers, and short fibers,
    the cellulose fine fibers have an average diameter from 1 nm to 200 nm, and the rubber composition comprises from 1 part by to 20 parts by mass of the cellulose fine fibers relative to 100 parts by mass of the rubber component, and
    the short fibers have fiber lengths from 0.5 mm to 5.0 mm and an average diameter from 8 μm to 25 μm, and the rubber composition comprises from 5 parts by mass to 30 parts by mass of the short fibers relative to 100 parts by mass the rubber component.

2. The power transmission belt of claim 1, wherein the cellulose fine fibers have an average diameter from 2 nm to 50 nm.

3. The power transmission belt of claim 1, wherein the cellulose fine fibers are produced by chemical defibration.

4. The power transmission belt of claim 1, wherein the rubber component is at least one of an ethylene propylene copolymer, an ethylene-propylene-diene terpolymer, an ethylene-octene copolymer, and ethylene-butene copolymer, a chloroprene rubber, a chlorosulfonated polyethylene rubber, or a hydrogenated acrylonitrile rubber.

* * * * *